United States Patent Office 3,511,390
Patented May 12, 1970

3,511,390
APPARATUS FOR CHARGING SHAFT-TYPE FURNACES
Heinz-Dieter Pantke, Essen, Ulrich Pohl, Oberhausen-Osterfeld, Herbert Hickmann, Oberhausen, and Werner Starossa, Duisburg, Germany, assignors to Huttenwerk Oberhausen AG., Oberhausen, Rhineland, Germany, a corporation of Germany
Filed Mar. 6, 1968, Ser. No. 711,102
Claims priority, application Germany, Mar. 7, 1967, H 62,049
Int. Cl. F27b 1/20
U.S. Cl. 214—21          10 Claims

ABSTRACT OF THE DISCLOSURE

A device for charging blast and cupola shaft-type furnaces with metallurgical agglomerates in which an upper horizontal slide plate forms a closure between a conveyer and a tray tiltable about a horizontal axis to discharge its contents past a second horizontal-plate closure, the conveyer being displaceable in the direction of the horizontal tilting axis of the tray to ensure uniform distribution of the charging furnace.

---

The present invention relates to an apparatus for the charging of shaft-type furnaces with comminuted material and, more particularly, to an apparatus for this purpose which is designed to distribute the comminuted material uniformly in the furnace and block the escape of substances therefrom.

Shaft-type furnaces, such as metallurgical furnaces of the cupola and blast-furnace type, especially blast furnaces and high-pressure shaft furnaces, generally comprise an upright column which is charged from the top with a descending stream of comminuted raw material, e.g. a metallurgical ore or pretreated metallic aggregate, for subjecting the downwardly moving charge to treatment with an upcoming gas stream which subjects the charge to heat and chemical action serving to purify the metal, to smelt the metal and/or to reduce the ore to the elemental metal. The gas may be introduced from tuyères, blast pipes or the like located beneath the charge and may be disposed above a collecting chamber in which in which liquid metal and/or slag is accumulated. Of special interest are the shaft-type furnaces using comminuted materials such as green-compacted metallurgical ores in the form of pellets, granules or briquettes which have been employed to an increasing extent of late to restrict frictional and abrasive deterioration of the furnace and wherever upgrading of the ore is required; however, this invention is not to be construed as applying solely to furnaces of the latter type although it is most desirably employed with them.

Shaft-type furnaces of the character described usually cooperate with charging means at the upper end of the furnace, e.g. a skip loader, which delivers the charge in a sequence of doses, the upper end of the furnace being also formed with closure means designed to bar the escape of substances (e.g. gases and particles entrained thereby), from the furnace during the charging stage. A number of closure systems have been proposed or are in common use for this purpose. For example, extant furnaces commonly make use in a double-bell arrangement in which a pair of downwardly diverging cones are spaced one above the other. For example, the charge may be introduced from the open upper bell while the lower bell is closed and, upon closure of the upper bell, is distributed in the furnace. Systems of this type have the disadvantage that the comminuted charge tends to form a frustoconical pile as it is metered into the furnace with separation of foreign particles from coarser particles during this process. As a consequence, stratification of the particles develops with reduced uniformity of gas flow and in direction of the rising gas stream with the charge. Still other systems have made use of flap-like or swingable closures above a rotatable distributor adapted to more uniformly disperse the charge in the interior of the furnace; the distributor forms one of the closure members. However, these systems also provide within the mechanism a fairly long cascade of the comminuted material against the rising gas stream with stratification and leads to abrasive deterioration of the sealing surfaces. Additionally, the operation of such systems has been found to be highly complex and difficult to control.

It is, therefore, the principal object of the present invention to provide an improved apparatus for the charging of shaft-like furnaces and, especially, upright cupola, blast and high-pressure furnaces adapted to be used for the treatment of raw material, metal ores and the like in comminuted form (e.g. as so-called "green pellets").

Another object of the instant invention is to provide a system for charging comminuted materials into an upright furnace structure in which a more uniform distribution of the material will be attained and stratification of fine and coarse particles will be avoided.

A further object of this invention is to provide a system for the charging of comminuted materials into an upright furnace which is relatively simple, has a minimum number of parts capable of breakdown, ensures a good seal against escape of substances from the interior of the furnace without deterioration of the sealing surfaces with time, and is of inexpensive construction.

These objects and others which will be apparent hereinafter are attained, in accordance with the present invention, by the provision of an apparatus for charging an upstanding shaft-type furnace which comprises a conveyer means for advancing the comminuted material to the apparatus and a pair of upper and lower closure members adapted to bar the escape of gas and gas-entrained particles from the furnace, the invention residing in the discovery that, when the dispensing device, which receives the comminuted material from the conveyer and is located between the closure members, is a tiltable tray whose swinging axis extends parallel to the direction of movement of the conveyer so that the latter is displaceable in the direction of this horizontal axis, a uniform layer of comminuted material is deposited in the furnace without formation of a piling cone and with a substantially uniform thickness. According to a more specific feature of this invention, the conveyer means is a band-type conveyer which may be discontinuously operable in the cadence of swinging movement of the tiltable distributing tray while the closure members are swingable flaps or horizontally shiftable gates lying in planes perpendicular to the axis of the furnace above and below the tiltable tray.

It has been found further that the use of linearly slidable horizontal gates, which are displaceable between a chamber receiving the gate in the open condition thereof, and a position in which the gate spans the mouth of the furnace, is capable of overcoming some of the substantial disadvantages of earlier systems whereby particle-entraining gases at high velocity form ridges, grooves and the like, by mechanical erosion, in the sealing edges of the closure members. In fact, with the linear horizontal displacement of the plate-like gates, which are slidably guided along their opposite lateral edges in recesses of a support frame surmounting the furnace and with the forward edge of the gate (in the direction of closing displacement) being lodged in a similar recess at the far side of the frame, there appears to be no tendency toward deterioration of the sealing parts. The gates may, as described earlier, operate alternately in the cadence of displacement of the distributing tray. Advantageously, a hydraulic or pneumatic system is provided in which the slidable gates are shifted by piston-and-cylinder arrangements while a further cylinder serves to displace the tiltable tray via a bell-crank lever. It has been found that this type of control system is particularly satisfactory for use when a number of tiltable trays are used in tandem with reversible conveyers or duct systems.

The tray, which receives a relatively thin layer of the comminuted material, deposits it within the furnace substantially uniformly as has been indicated earlier and maintains the material out of contact with the sealing surfaces of the closure members. This feature is particularly desirable when high-pressure, gas-fed, shaft-type furnaces are employed since leakage and pressure losses through the closure members can be avoided even after long periods of use. In the system of the present invention, moreover, the closure members serve solely to seal the furnace and do not constitute part of the distributing means for the comminuted material. Additionally, separation or stratification of the charge is avoided, in part as a consequence of the relatively small thickness of the layer deposited in each operative cycle of the device. Each layer is covered by a succeeding layer of similarly small thickness so that the column of charge in the furnace is not characterized by regions of high and low porosity which may be traversed by the gas to a greater or lesser extent. The configuration of the tray can correspond substantially to that of the furnace and may be displaced alternately to opposite sides of its axis to ensure the uniform distribution of the charge mentioned earlier.

These and other objects, features and advantages of the present invention will become more readily apparent from the following description, reference being made to the accompanying drawing in which.

Figure 1:
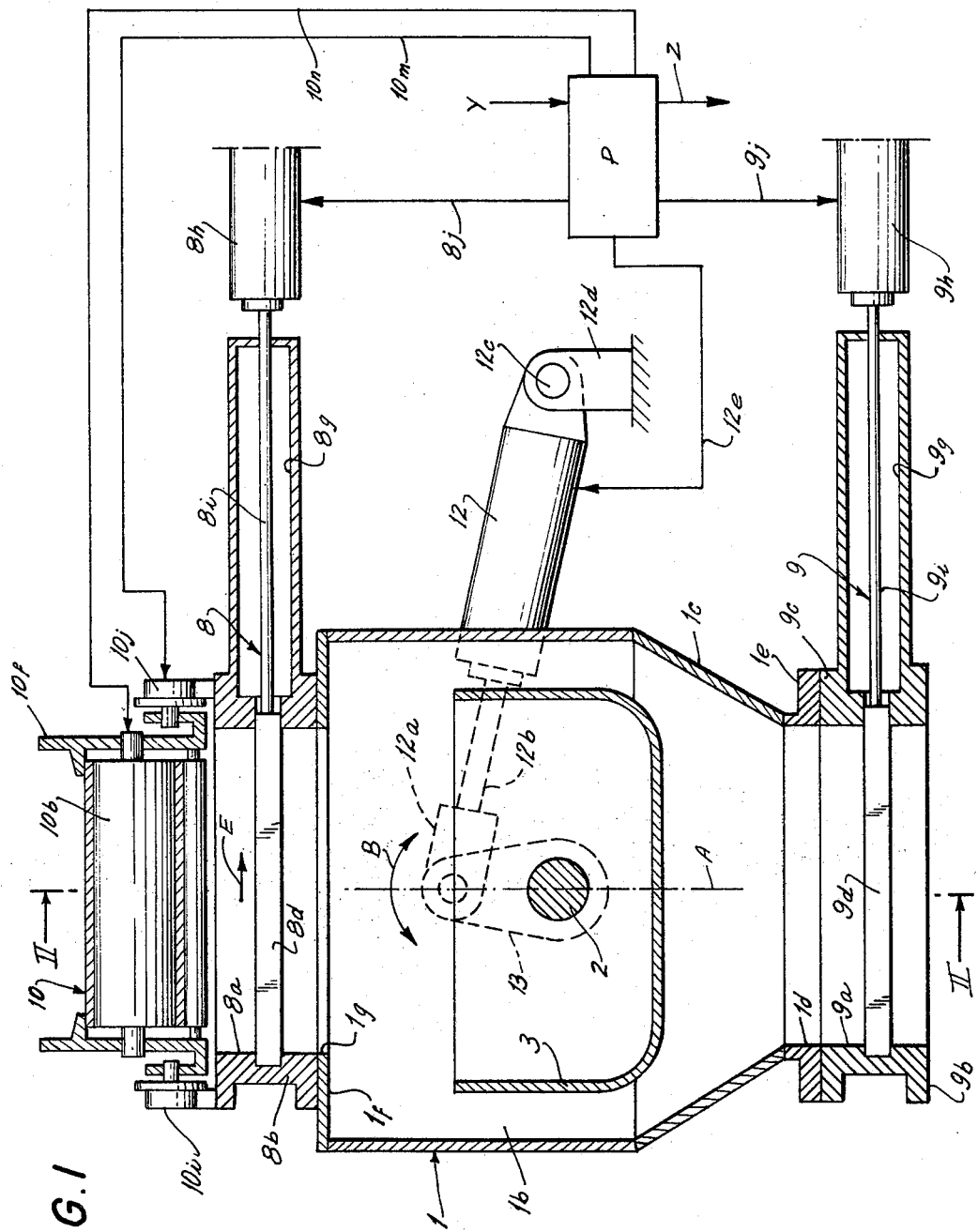
FIG. 1 is a vertical cross-sectional view through an apparatus for charging a shaft-type furnace with comminuted material in accordance with this invention.
Figure 2:
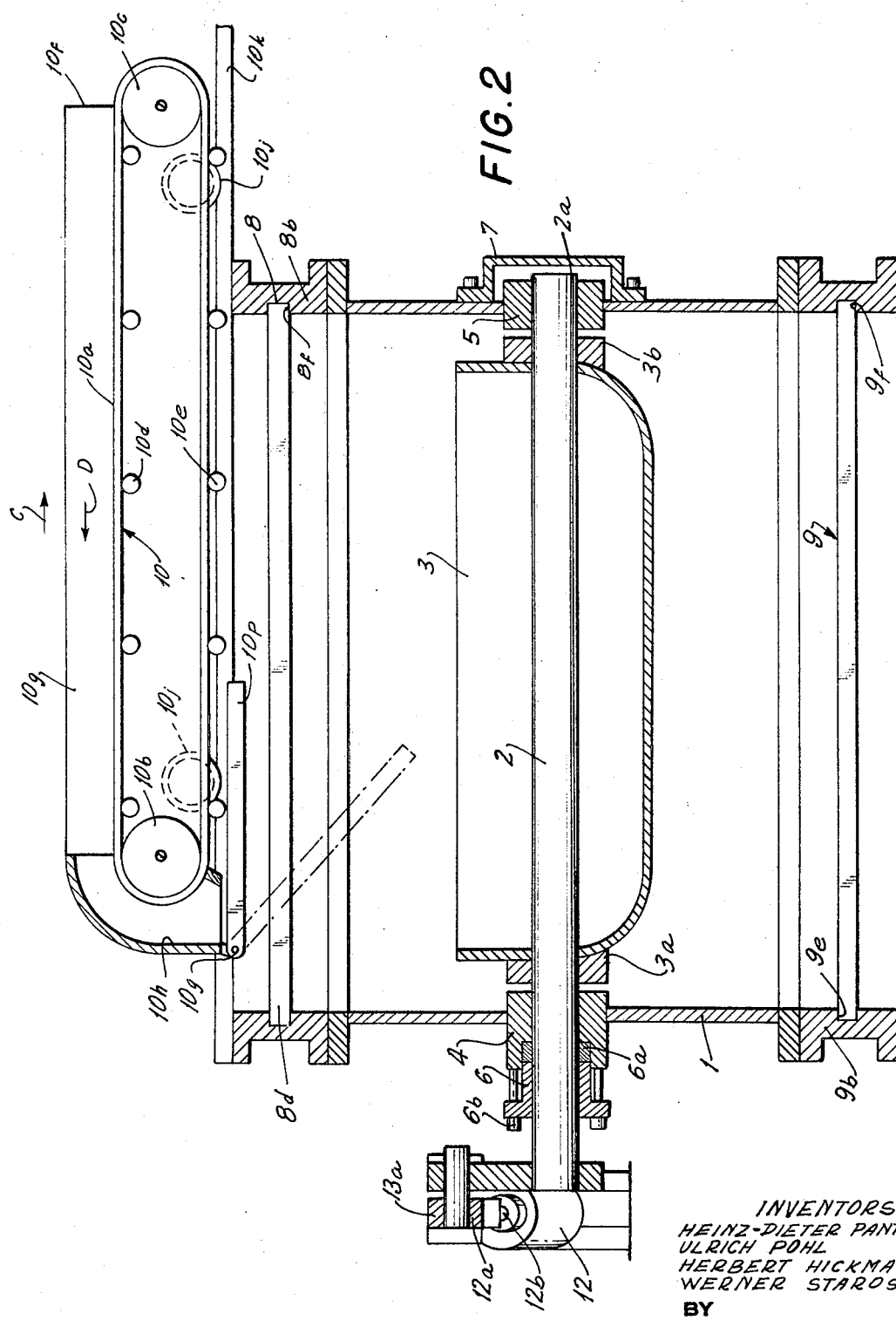
FIG. 2 is a cross-sectional view taken generally along the line II—II of FIG. 1.
Figure 5:
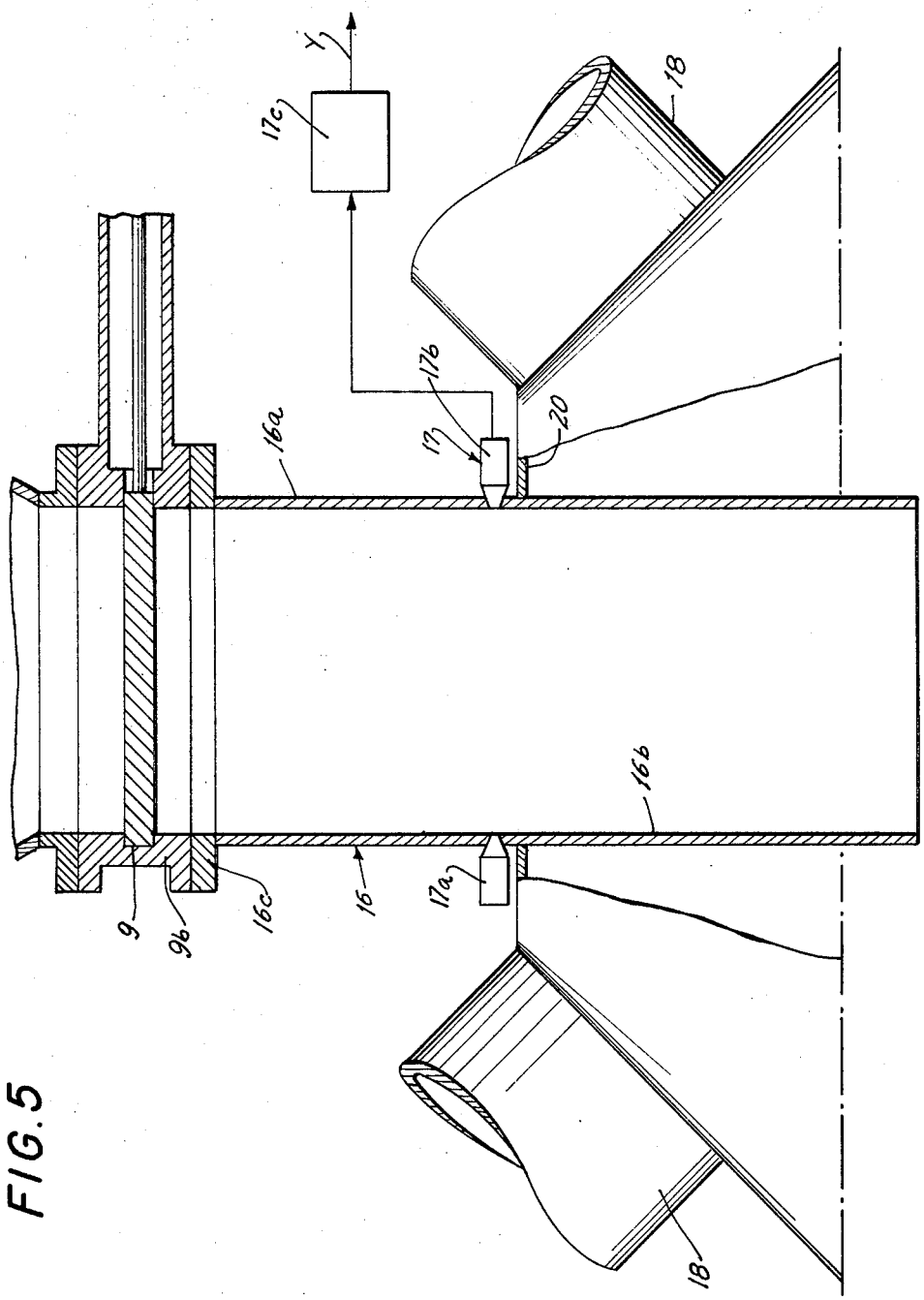
FIG. 5 is a vertical cross-sectional view of a charging duct of a furnace forming part of the device of FIGS. 1 and 2.

In FIGS. 1 and 2, there is shown a charging device adapted to surmount a vertically extending charging conduit (FIG. 5) of a shaft-type cupola or blast furnace, especially a high-pressure shaft or columnar furnace for the treatment of comminuted metallurgical raw materials, e.g. pelletized upgraded metal ore or partially refined metal agglomerates, which comprises an upwardly open housing 1 whose vertical walls 1a define a charging chamber 1b between upper and lower closure devices represented at 8 and 9, respectively. The housing 1 has inwardly and downwardly converging walls 1c forming a funnel whose mouth 1d is coextensive with the inner opening 9a of a lower guide ring 9b forming part of the lower closure member 9. The housing 1 is mounted upon the ring 9b by bolts traversing flanges 1e and 9c and is provided with an inwardly extending cover flange 1f whose opening 1g is aligned and coextensive with the openings 1d and 9a. The guide ring 8b of the upper closure means 8 has its opening 8a registering coextensively with the opening 1g all of the openings 8a, 1g, 1d, 9a being centered with respect to and lying within the outlines of a swingable tray 3 forming dispensing means between the upper and lower closure means 8 and 9.

As can be seen from FIG. 1, the lower closure means comprises a horizontal plate 9d forming a slider which is guided perpendicularly to the vertical axis A of the charging device and transversely of the swinging axis 2 of the tiltable tray 3 in a pair of guide channels 9e and 9f along opposite sides of the ring 9b (FIG. 2) and is receivable within a lateral compartment 9g in the retracted position of the slide plate. The means for displacing the plate 9d can comprise a double-acting hydraulic cylinder 9h whose piston rod 9i extends through the chamber 9g as shown in FIG. 1. A programmer P, whose function will be described in greater detail hereinafter and which is of any conventional type, operates the cylinder 9h as represented by line 9j.

Similarly, the upper closure means 8 comprises a horizontally shiftable closure plate 8d slidably guided in the channels 8e and 8f of the ring 8b and is adapted to be withdrawn into the chamber 8g by the double-acting cylinder 8h whose piston rod 8i extends through the chamber 8g and is controlled by the programmer P as represented at 8j.

From FIG. 2, it may be seen that the tiltable tray 3 is elongated and of generally elliptical configuration while having a pair of longitudinally extending bosses 3a and 3b securing this tray to the tilting shaft 2a mounted in a pair of trunnion bearings 4 and 5 in the opposite walls of the housing 1 for swinging movement alternately in opposite directions as represented by the arrow B (FIG. 2). To seal the housing 1 in the region of the bearings, there is provided a cover 7 at the free end of the shaft 2a to enclose the portion of this shaft and the bearing 5 traversing the wall of the housing. On the opposite side of the housing, the bearing 4 is provided with a packing 6a held in place by a packing bushing 6 bolted at 6b to the bearing 4.

The shaft 2a is provided with a bell-crank lever 13 tied by a pivot pin 13a to the lug 12a of a piston rod 12b whose hydraulic cylinder 12 is swingably mounted at 12c on a trunnion 12d. The cylinder 12, shown in its intermediate position, is operated by the programmer P as represented by the line 12e. The programmer P also displaces a conveyer-belt assembly 10 above the upper closure means 8 which delivers the comminuted material to the tiltable tray 3. The conveyer arrangement comprises an endless band 10a passing about a pair of terminal rollers 10b and 10c and supported intermediate these rollers by idlers 10d and 10e. The conveyer band is mounted upon a carriage 10f open upwardly at 10g to receive the comminuted material from a conventional skip loader or, preferably, one of the alternating feeding systems 11 or 14 of FIGS. 3 and 4.

The carriage 10f has, at its left-hand end (FIG. 2), a downwardly open dispensing spout 10h which is aligned, in its left-hand position, with one longitudinal end of the tiltable tray 3 and receives the comminuted material passing over the discharge side roller 10b. The carriage is provided along its longitudinal sides with support wheels 10i and 10j guided on rails 10k mounted upon the ring 8b (FIG. 2). Thus, the carriage 10f may be displaced in the direction of arrow C, i.e. in the direction of the axis 2 of the tiltable tray 3, while the conveyer 10a has its upper reach displaceable in the direction of arrow D synchronously with the retraction of the carriage from its position shown in the drawing to deposit the comminuted material in the tiltable tray. As shown in FIG. 1, the programmer P controls both the carriage 10f (line 10m) and the conveyer band 10a (line 10n).

The programmer P may have an input Y and a further output Z or Z′ adapted to control the alternating feed means of FIGS. 3 and 4 as described below and is designed to carry out the following program:

(a) Assuming the upper reach of conveyer 10a to have been supplied with the comminuted material and to be in the position illustrated in FIG. 2, the lower slide plate 9d to be in its closed position and the tray 3 to be in a non-tilted condition, the slide plate 8d is opened (arrow E in FIG. 1) by its withdrawal into the chamber 8g. Note that the programmer P ensures closure of slider 9d whenever slide 8d is open and vice versa.

(b) After slide 8d has been fully withdrawn (arrow E), the conveyor band 10a is displaced to the left (arrow D of FIG. 2) synchronously with retraction of the carriage 10f (arrow C) to deposit the comminuted material carried out by the upper reach of the conveyer over the discharge-side roller 10b through the dispensing chute 10h and into the tiltable tray 3 in the form of a uniform layer.

(c) Upon completion of the filling of the tray 3, the slider 8d is closed by displacement to the left (FIG. 1) while the carriage 10f is shifted in the direction of arrow D and its upper ridge 10n receives a fresh charge of the comminuted material; upon full closure of plate 8d, plate 9d is opened by withdrawal to the right (FIG. 1) into the compartment 9q.

(d) With the plate 9d in its fully retracted condition, cylinder 12 is actuated to tilt the tray 3 about its axis 2 in, for example, the clockwise sense (FIG. 1) thereby depositing the comminuted material contained in the tray upon the previous column of charge in the furnace.

(e) When the tray 3 has been emptied, cylinder 12 returns it in the opposite sense to its normal position (FIG. 1) while cylinder 9h closes the slide plate 9d.

(f) Steps (a) through (d) are repeated with, however, tilting movement of the tray 3 in the counterclockwise sense to empty the tray.

The sequence (a)–(f) constitutes one operating cycle of the device. The charge carried by the conveyer 10a during each operating cycle is, of course, equal to the capacity of the tray. It will be understood that all systems may be employed for distributing the comminuted material onto the tray and, for example, use may be made of a swingable or rocker conveyer whose discharge side (equivalent to the roller 10b) is displaced along the tray 3 parallel to and in the direction of the axis 2.

When the comminuted material contains particles, granules and pellets with a wide variation of particle sizes, this system prevents stratification in the final charge because, even though some separation by size may occur as the material cascades from the conveyer assembly 10 into the tiltable tray 3, the strata etxend all along the tiltable tray and the subsequent canting of the latter precludes stratification in the charge column. However, additional assurance can be gained, in the latter case, by depositing the comminuted material in the tray 3 in a multiplicity of thin layers by reciprocating the conveyer assembly 10 a number of times before tilting the tray. Thus, even if some stratification occurs in the tray 3 at each pass, the stratification will be in the form of alternating thin layers of large- and small-size particles and will be destroyed when the tray is dumped.

According to another feature of the invention, the tray 3 has a generally rectangular configuration with rounded bottom and side wall junctions while the discharge spout 10h may have an extension 10p which is automatically raised and lowered to follow the level of the comminuted material in the tray as shown by dot-dash lines and, consequently, reduce the free-fall distance of the material cascading into the tray from the conveyor assembly 10. When the tray 3 is filled, the chute 10p, which may be swingably mounted at a pivot 10g, may assume a horizontal position beneath the carriage 10f so as to prevent blocking same.

Figure 3:
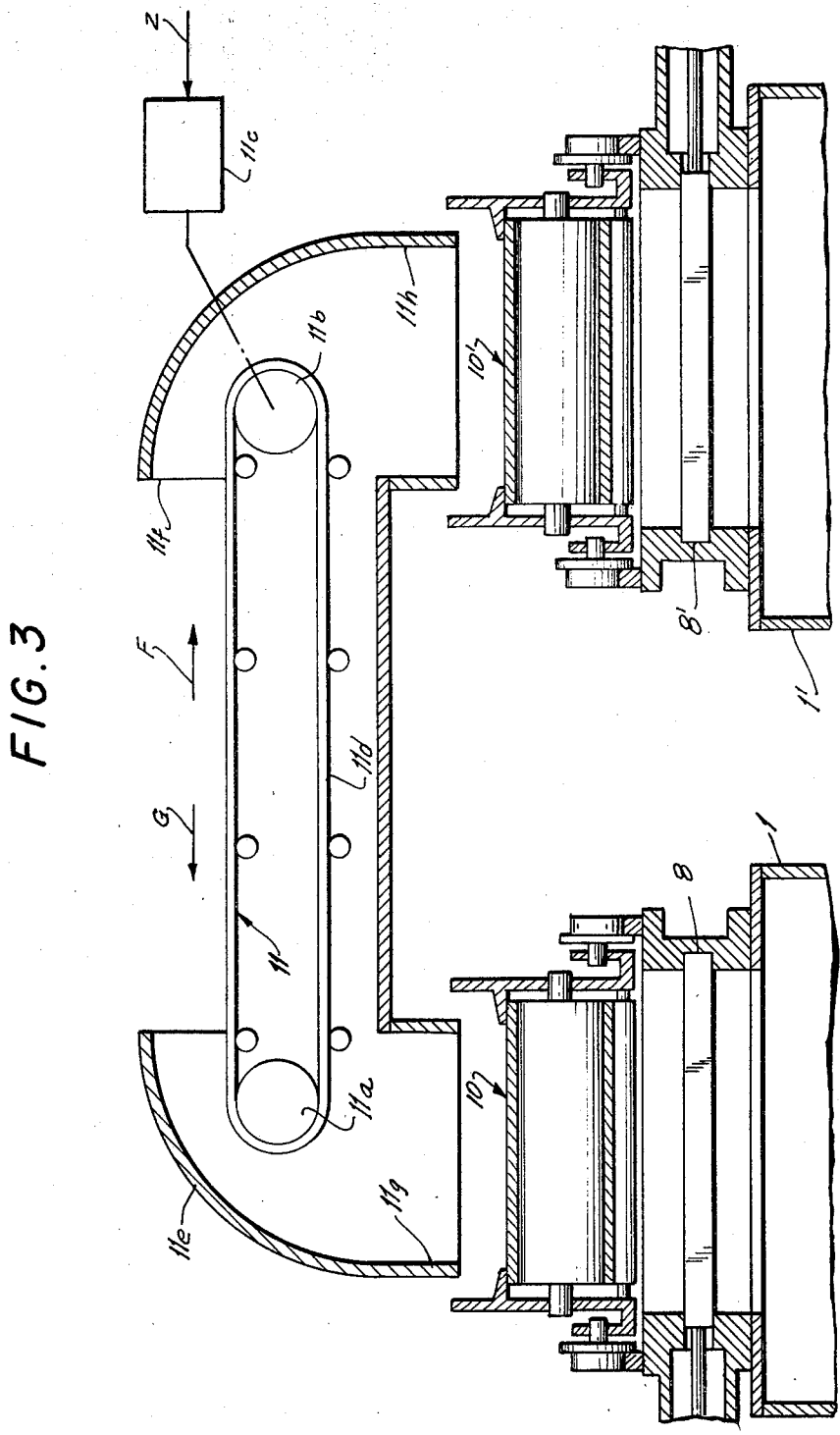
FIG. 3 is a view similar to FIG. 1 showing a pair of such devices operable in alternation and adapted to be supplied by a reversible conveyer.

The means for feeding the comminuted material onto the conveyer assemblies 10 and 10' of a pair of charging assemblies as represented at 1, 8 and 10 and 1', 8' and 10', respectively, is shown in FIG. 3. From this figure, it can be seen that the feed means includes an endless conveyer 11 whose drum 11a and 11b can be operated reversibly by a reversing drive 11c controlled by the input Z from the programmer P. The endless band 11d of this conveyer is partly enclosed in a hood 11e open at 11f to receive the comminuted material from a skip loader or the like of conventional construction. At its opposite ends, the hood 10e is formed with discharge spouts 11q and 11h respectively aligned with the openings 10q of the conveyor 10f of assemblies 10 and 10'. While the assembly 1, 8, 10 is operative with filling of the respective tray 3 from the conveyer band 10a, the band 11d is displaced in the direction of arrow F to load the conveyer band of assembly 10' and, conversely when the conveyer band of assembly 10' supplies its tiltable tray, the band 11d is reversed and driven in the direction of arrow G to load the upper reach of conveyer 10a.

Figure 4:
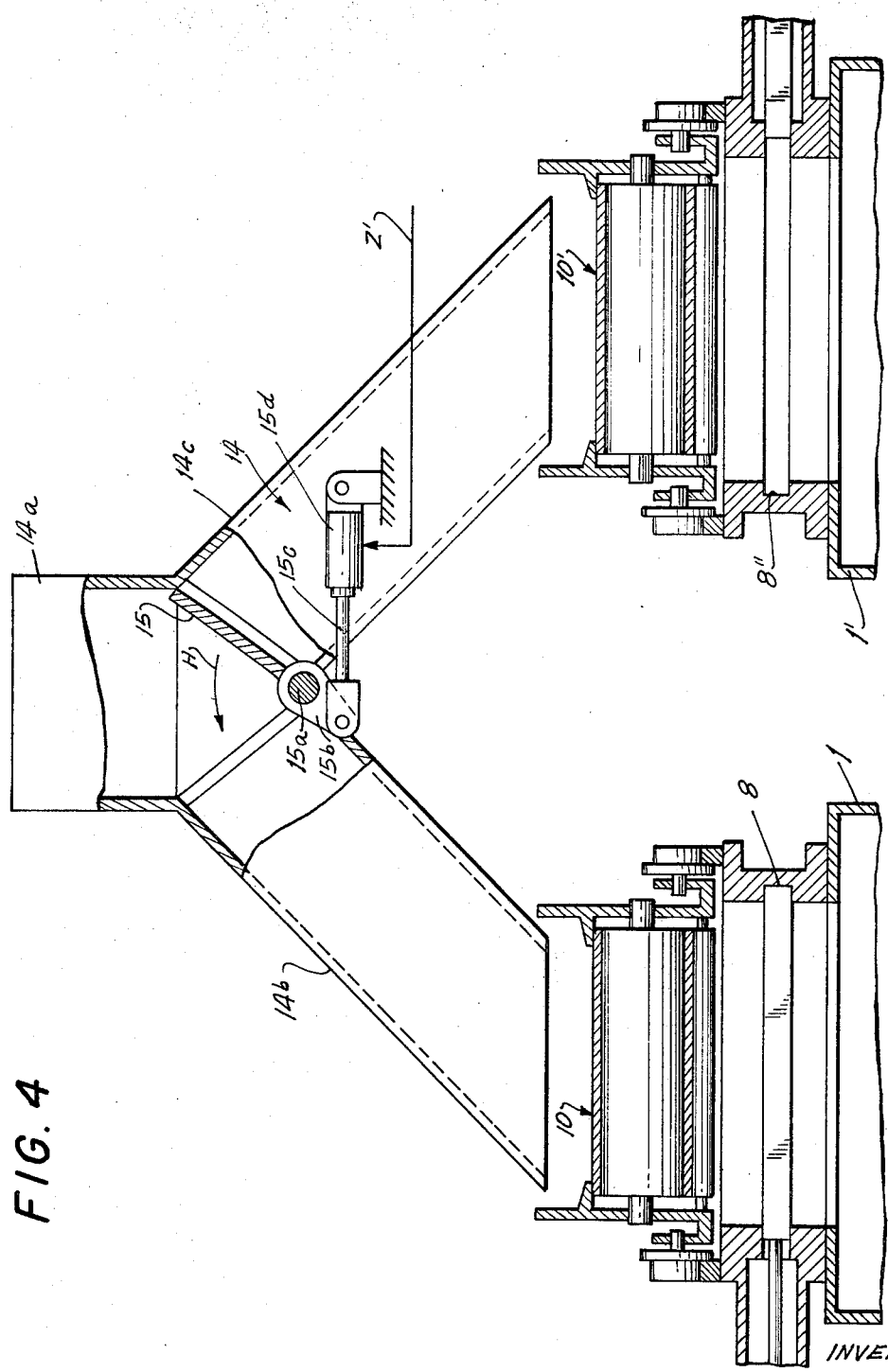
FIG. 4 is a view corresponding to FIG. 3 of another embodiment of this invention.

Another reversible feed system is shown in FIG. 4 at 14. In this embodiment, the skip loader deposits the connected material into an upstanding chamber 14a of an inverted-Y duct system whose divergent legs 14b and 14c form chutes respectively registering with the conveyer assemblies 10 and 10'. At the vertex of these legs, a swingable deviating flap 15 is pivoted on a shaft 15a whose bell-crank lever 15b is articulated to the piston rod 15c of a schematically represented cylinder 15d. The cylinder 15d is operated by the programmer P as represented by the line Z'. With the position of the flap 15 shown in FIG. 4, the comminuted material is diverted to the left and passes on to the stationary conveyer assembly 10 via the leg 14b of the duct system while the other assembly 10' is operated to dispense its load through the now open closure arrangement 8' into a chamber 1' of the right-hand charging apparatus. When the flap 15 is swung by the programmer P in the counterclockwise sense (arrow H), the comminuted material is diverted through chute 14c onto the stationary conveyer 10'.

Below the charging assemblies, there is provided a downwardly extending duct 16 (FIG. 5) whose upper portion above the furnace wall 20 is designated 16a and whose lower portion extends into the furnace chamber as shown at 16b. The duct 16 has a flange 16c upon which the ring 9b of closure device 9 is mounted while a detector 17 is provided at the junction between the section 16a and 16b to trigger the programmer P. The detecting device 17 may comprise a radioactive-isotope source 17a trained upon a radiation detector 17b whose counter 17c has an output Y designed to trigger the programmer P whenever the passage of the descending charge is completed. The upper portion 16a of duct 16 is dimensioned to accommodate the full charge of the tilting tray 3. Preferably, the lower-part portion 16b of the duct 16 terminates below the outlet 18 for the gases so that in the region of these outlets there is no cascade of fine particles which may be entrained in the gas stream.

We claim:

1. An apparatus for the top-charging of a shaft-type furnace with a comminuted material, comprising:

housing means at the upper end of said furnace communicating with the interior thereof;

alternatingly operating upper and lower closure means spaced apart in said housing means for selectively blocking access to and from said furnace through said housing means;

a dispensing tray swingably mounted in said housing means between said upper closure means and said lower closure means and tiltable about a horizontal axis for dumping a charge of said comminuted material deposited in said tray into said furnace; and conveyer means above said upper closure means displaceable along said axis for depositing said comminuted material in said tray to form said charge, said conveyer means including an endless band having a discharge-side roller rotatable about an axis perpendicular to the axis of said tray but displaceable therealong, and a carriage supporting said endless band and displaceable horizontally in the direction of said axis of said tray, said carriage and said band being synchronously movable during dispensing of said comminuted material into said tray.

2. An apparatus as defined in claim 1 wherein said upper closure means and said lower closure means each comprises a respective horizontally slidable plate guided in said housing means and operatively connected for alternate retraction to open communciation between said conveyer means and said tray while closing communication between said tray and said furnace, and for closing communication between said conveyer means and said tray while opening communication between said tray and said furnace.

3. An apparatus as defined in claim 2 wherein said housing means includes a duct extending from said lower closure means into said furnace and said furnace has at least one gas outlet at its upper end, said duct terminating below said outlet.

4. A system for the top-charging of a shaft-type furnace with a comminuted material, said system comprising:
   housing means at the upper end of said furnace communicating with the interior thereof,
   alternatingly operating upper and lower closure means spaced apart in said housing means for selectively blocking access to and from said furnace through said housing means.
   a dispensing tray swingably mounted in said housing means between said upper closure means and said lower closure means and tiltable about a horizontal axis for dumping a charge of said comminuted material deposited in said tray into said furnace,
   conveyer means above said upper closure means displaceable along said axis for depositing said comminuted material in said tray to form said charge; and
   reversing feed means for alternatively depositing said comminuted material upon the conveyer means of the first and second apparatuses.

5. An apparatus as defined in claim 4 wherein each of said conveyer means includes an endless band having a discharge-side roller rotatable about an axis perpendicular to the axis of said tray but displaceable therealong.

6. An apparatus as defined in claim 5 wherein said conveyer means includes a carriage supporting said endless band and displaceable horizontally in the direction of said axis of said tray, said carriage and said band being synchronously movable during dispensing of said comminuted material into said tray.

7. A system as defined in claim 4 wherein said feed means includes duct means having a pair of diverging chutes registering with the respective conveyer means and a swingable flap at the vertices of said chutes for alternately diverting comminuted material to said chutes.

8. A system as defined in claim 4 wherein said feed means includes a reversible conveyer belt having its ends overlying the respective conveyer means of said apparatuses.

9. An apparatus for the top-charging of a shaft-type furnace with a comminuted material, comprising:
   housing means at the upper end of said furnace communicating with the interior thereof;
   alternatingly operating upper and lower closure means spaced apart in said housing means for selectively blocking access to and from said furnace through said housing means;
   a dispensing tray swingably mounted in said housing means between said upper closure means and said lower closure means and tiltable about a horizontal axis for dumping a charge of said comminuted material deposited in said tray into said furnace;
   conveyer means above said upper closure means displaceable along said axis for depositing said comminuted material in said tray to form said charge; and
   detector means in said housing means between said lower closure means and said furnace for initiating sequential operation of said closure means, said tray and said conveyer means.

10. An apparatus as defined in claim 9 wherein said housing means includes an elongated duct extending from said lower closure means into said furnace, said detector means being disposed along said duct at a location spaced from said lower closure means by a distance such that said duct between the detector means and said lower closure means has a volume substantially equal to the charge capacity of said tray.

References Cited
UNITED STATES PATENTS

| | | | |
|---|---|---|---|
| 1,724,402 | 8/1929 | Holden | 214—35 |
| 3,232,494 | 2/1966 | Poach | 214—17 XR |
| 3,394,826 | 7/1968 | Slagley et al. | 214—35 |

ROBERT G. SHERIDAN, Primary Examiner

U.S. Cl. X.R.

214—35